United States Patent
Mohan et al.

(10) Patent No.: US 6,177,789 B1
(45) Date of Patent: Jan. 23, 2001

(54) LINE DRIVER FOR PRODUCING OPERATING CONDITION INVARIANT SIGNAL LEVELS

(75) Inventors: Jitendra Mohan, Sunnyvale; Devnath Varadarajan, Mountian View; Vijaya Ceekala, Union City, all of CA (US)

(73) Assignee: National Semiconductor Corporation, Santa Clara, CA (US)

( * ) Notice: Under 35 U.S.C. 154(b), the term of this patent shall be extended for 0 days.

(21) Appl. No.: 09/495,133

(22) Filed: Jan. 31, 2000

(51) Int. Cl.[7] ........................................... G05F 3/16
(52) U.S. Cl. .................................................. 323/316
(58) Field of Search .................... 323/311, 312, 323/315, 316

(56) References Cited

U.S. PATENT DOCUMENTS 5,629,611 * 5/1997 McIntrye ........................ 323/313

OTHER PUBLICATIONS

F. You et al., An Improved Tail Current Source for Low Voltage Applications, IEEE Journal of Solid–State Circuits, vol. 32, No. 8, pp. 1173–1180 (1997), Aug.*

* cited by examiner

Primary Examiner—Peter S. Wong
Assistant Examiner—Gary L. Laxton
(74) Attorney, Agent, or Firm—Limbach & Limbach L.L.P.

(57) ABSTRACT

A line driver outputs a pair of transmit signals TX+ and TX− that have substantially reduced output level variations due to variations in process, voltage, and temperature. The reduced output level variations are provided by varying the magnitude of the current that sets up the voltages of the transmit signals in a manner that offsets variations in the power supply voltage, temperature, and process, and by limiting variations of the bandgap current source to process and temperature only.

17 Claims, 4 Drawing Sheets

FIG. 3A
(PRIOR ART)
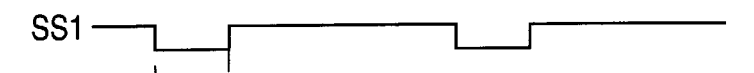
FIG. 3B
(PRIOR ART)
FIG. 3C
(PRIOR ART)
FIG. 3D
(PRIOR ART)
FIG. 3E
(PRIOR ART)
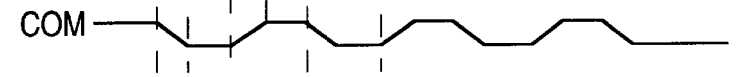
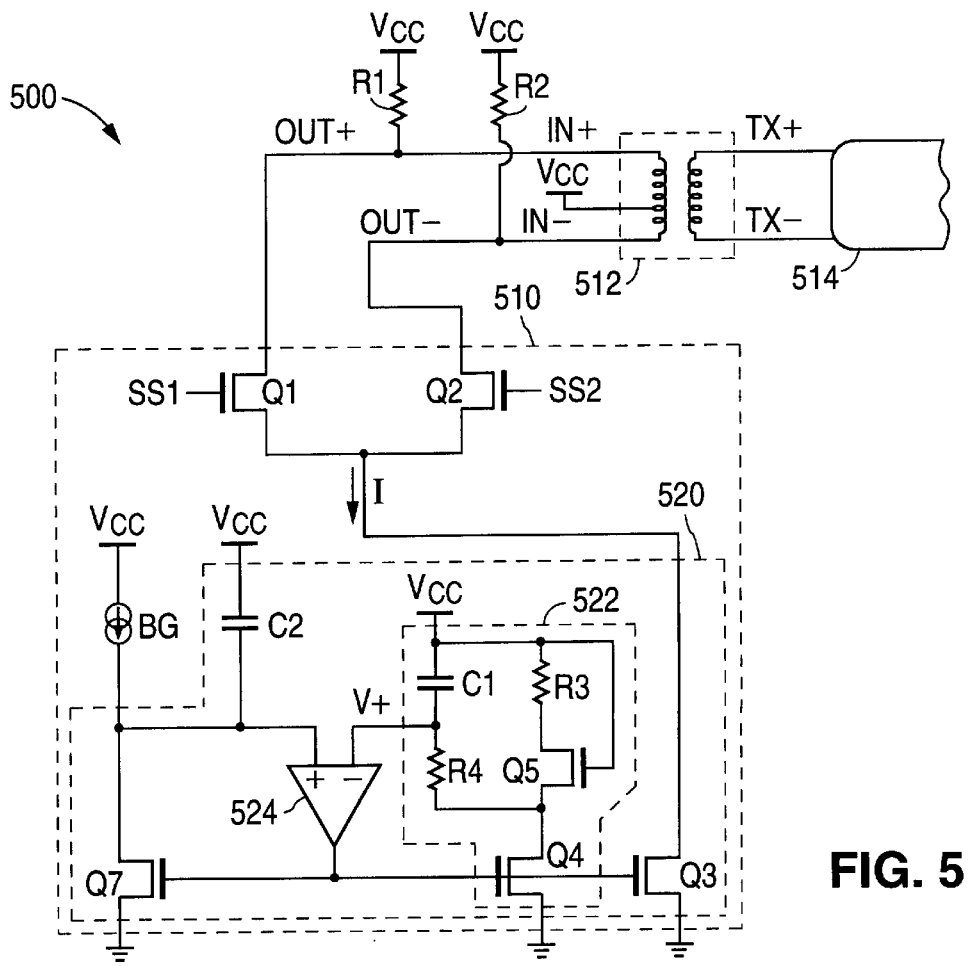
FIG. 5

LINE DRIVER FOR PRODUCING OPERATING CONDITION INVARIANT SIGNAL LEVELS

BACKGROUND OF THE INVENTION

1. Field of the Invention

The present invention relates to line drivers and, more particularly, to a line driver for producing operating condition invariant signal levels.

2. Description of the Related Art

A line driver is a device that drives a signal onto a transmission line, such as a local-area-network. Line drivers are typically associated with a specific network standard, such as the 100BASE-T standard (IEEE 100-Mbit/sec unshielded twisted-pair (UTP) 802.3), which defines the signaling rate, the signaling scheme, and the type of wiring of the network. One signaling protocol that is used with 100BASE-T-based networks is the MLT-3 (tri-level) signaling protocol which defines a 2Vpp signal that is output at 125 Mbits per second.

FIG. 1 shows a schematic diagram that illustrates a conventional 100BASE-T MLT-3 line driver 100. As shown in FIG. 1, driver 100 includes a transmit circuit 110 which has a pair of differential outputs OUT+ and OUT−, and a transformer 112 which has a pair of inputs IN+ and IN− that are connected to the outputs OUT+ and OUT−. In addition, transformer 112 also has a pair of transmission outputs TX+ and TX− that are connected to a transmission line 114, such as a 100-ohm line. Further, transformer 112 has a center tap connected to a power supply voltage Vcc.

As additionally shown in FIG. 1, circuit 100 includes a first resistor R1 which is connected between the power supply voltage Vcc and the output OUT+, and a second resistor R2 which is connected between the power supply voltage Vcc and the output OUT−. Resistors R1 and R2 each have a resistance that is equal to one-half the impedance of the transmission line, i.e. 50 ohms.

FIG. 2 shows a schematic diagram that illustrates a conventional transmit circuit 200. As shown in FIG. 2, circuit 200, which represents a first example of an implementation of circuit 110, includes a first transistor Q1 which has a drain connected to the output OUT+, a gate connected to receive a first signal SS1, and a source. Further, circuit 200 also includes a second transistor Q2 which has a drain connected to the output OUT−, a gate connected to receive a second signal SS2, and a source.

In addition, circuit 200 further includes a current source 210 which is connected between transistors Q1 and Q2, and ground. Current source 210, in turn, includes a tail current transistor Q3 which has a drain connected to the sources of transistors Q1 and Q2, a gate, and a source connected to ground.

Current source 210 also includes a mirroring transistor Q4 which has a drain, a gate connected to the gate of transistor Q3 and the drain of transistor Q4, and a source connected to ground. Transistor Q3 is formed to be A times larger than transistor Q4. Further, a bandgap current source BG outputs a compensated current to transistors Q3 and Q4 that defines the gate-to-source voltages of transistors Q3 and Q4. Since the gate-to-source voltages are defined by a compensated current, the gate-to-source voltages are substantially independent of variations in the power supply voltage Vcc.

FIGS. 3A–3E are timing diagrams that illustrate the operation of driver 100 of FIG. 1 when utilizing transmit circuit 200 of FIGS. 2 and the MLT-3 signaling protocol. The MLT-3 signaling protocol defines three signal levels which correspond to three of the logic states defined by the first and second signals SS1 and SS2.

As shown in FIGS. 3A–3D, the first signal level occurs when the signal SS1 has a logic low and the signal SS2 has a logic high such that transistor Q1 is turned off and transistor Q2 is turned on. Under these conditions, current source 210 pulls a current I through resistor R2 which sets up a voltage on input IN− that is less than the power supply voltage Vcc. (The voltage on input IN− is less than the power supply voltage Vcc since the voltage is equal to the power supply voltage Vcc less the voltage drop across resistor R2.)

At the same time, the action of transformer 112 causes a complementary voltage, which is greater than the power supply voltage Vcc, to appear on the input IN+. The voltage on input IN+ is greater than the power supply voltage Vcc by the same magnitude that the voltage on input IN− is less than the power supply voltage Vcc. Thus, a positive voltage is applied across the inputs IN+ and IN−.

The second signal level occurs when the signal SS1 has a logic high and the signal SS2 has a logic low such that transistor Q1 is turned on and transistor Q2 is turned off. Unlike the previous example, current source 210 now pulls the current I through resistor R1 which sets up a voltage on input IN+ which is less than the power supply voltage Vcc. (As in the previous example, the voltage on input IN+ is less than the power supply voltage Vcc since the voltage is equal to the power supply voltage Vcc less the voltage drop across resistor R1.)

At the same time, the action of transformer 112 causes a complementary voltage, which is greater than the power supply voltage Vcc, to appear on the input IN−. (As above, the voltage on input IN− is greater than the power supply voltage Vcc by the same magnitude that the voltage on input IN+ is less than the power supply voltage Vcc.) Thus, a negative voltage, which has a polarity opposite to the polarity of the positive voltage, is applied across the inputs IN+ and IN−.

The third signal level occurs when the signals SS1 and SS2 both have logic highs such that transistors Q1 and Q2 are both turned on. In this case, current source 210 pulls one-half of the current I through both resistors R1 and R2 which sets up substantially equivalent voltages on inputs IN+ and IN−. The action of transformer 112, in turn, forces the voltages on inputs IN+ and IN− to both be substantially equal to the power supply voltage Vcc.

In addition, as shown in FIG. 3E, a voltage COM at the drain of tail current transistor Q3 varies as transistors Q1 and Q2 are turned on and off. The variation results from the difference in resistance provided by transistor Q1 when transistor Q1 sinks all of current I, and when transistor Q1 sinks only one-half of current I. The variation also results from the difference in resistance provided by transistor Q2 when transistor Q2 sinks all of current I, and when transistor Q2 sinks only one-half of current I.

One of the disadvantages of transmit circuit 200 is that transistor Q3 does not have a high enough output impedance. A lower output impedance means that variations in the power supply voltage Vcc lead to variations in the steady state peak-to-peak differential voltage ($V_{OD}$) of transmit signals TX+ and TX−.

Although the gate-to-source voltages of transistors Q3 and Q4 are substantially independent of variations in the power supply voltage Vcc, the voltage on the drain of transistor Q3 is not independent of the power supply voltage Vcc. For example, when the first signal level occurs, the signal SS1 has a logic low and the signal SS2 has a logic high, which is equal to the power supply voltage Vcc. As a result, the voltage on the drain of transistor Q3 is equal to the power supply voltage Vcc less the gate-to-source voltage of transistor Q2, i.e., Vcc−$V_{GS}$Q2. Thus, variations in the power supply voltage Vcc cause variations in the drain voltage of transistor Q3.

When the variations in the drain voltage of transistor Q3 are combined with the low output impedance of transistor Q3, variations in the drain voltage of transistor Q3 lead to variations in the current I. Variations in the current I lead to variations in the voltages at outputs OUT+ and OUT− which, in turn, cause the voltages of the transmit signals TX+ and TX− to also vary. Thus, variations in the power supply voltage Vcc and a low output impedance cause variations in the transmit signals TX+ and TX−.

Variations in the transmit signals TX+ and TX− can be reduced to fall within the MLT-3 specification by simply increasing the output impedance of current source 210. One way of increasing the output impedance is to cascode the current source. FIG. 4 shows a schematic diagram that illustrates a conventional transmit circuit 400.

As shown in FIG. 4, circuit 400, which represents a second example of an implementation of transmit circuit 110 of FIG. 1, includes transistors Q1 and Q2 configured as shown in FIG. 2, and a current source 410 which is connected between transistors Q1 and Q2, and ground, as a high-swing cascode circuit. Current source 410 includes a first tail current transistor Q31 which has a drain connected to the sources of transistors Q1 and Q2, a source, and a gate; and a second tail current transistor Q32 which has a drain connected to the source of transistor Q31, a source connected to ground, and a gate.

Current source 410 also includes a first mirroring transistor Q41 which has a drain, a gate connected to the gate of transistor Q31, and a source; and a second mirroring transistor Q42 which has a drain connected to the source of transistor Q41, a gate connected to the gate of transistor Q32 and the drain of transistor Q41, and a source connected to ground. Current source 410 additionally includes a bias transistor Q5 which has a drain, a source connected to ground, and a gate connected to the gates of transistors Q31 and Q41, and to the drain of transistor Q5. Transistors Q31, Q32, Q41, and Q42 are A times larger than transistor Q5.

Further, a bandgap current source BG outputs a compensated current to transistors Q32 and Q42 which sets the gate-to-source voltages of transistors Q32 and Q42. In addition, a bias current source BI outputs a bias current, which is approximately equal to the compensated current, to transistors Q31, Q41, and Q5. The compensated current sets the gate voltages of transistors Q31, Q41, and Q5 to 2$V_{GS}$− Vt (when the voltages at the drains of transistors Q32 and Q42 are equal to $V_{GS}$−Vt).

In operation, current source 410 performs the same as current source 210, except that there is less variation in the transmit signals TX+ and TX− due to variations in the power supply voltage Vcc. Current source 410 still suffers from the same problem that current source 210 suffers from; namely, that the voltage on the drain of transistor Q31 is equal to the power supply voltage Vcc less the gate-to-source voltage of either transistor Q1 or Q2 when one of the transistors is on and the other is off. Thus, variations in the power supply voltage Vcc cause variations in the drain voltage of transistor Q31.

Current source 410 has less variation in the transmit signals TX+ and TX− due to variations in the power supply voltage Vcc because current source 410 has a larger output impedance ($R_o$) than current source 210. Any change in the power supply voltage Vcc causes a current error that is equal to $\Delta I = \Delta Vcc/R_o$. Since the output impedance of circuit 410 is higher than the output impedance of circuit 210, circuit 410 reduces variations in the transmit signals TX+ and TX− more than circuit 210.

One of the disadvantages of current source 410, however, is that the silicon area consumed by current source 410 is approximately six times (6×) as large as that consumed by current source 210. In addition, current source 410 requires about twice the headroom as that required by current source 210. Thus, there is a need for a line driver that reduces variations in the transmit voltages TX+ and TX− that result from variations in the power supply voltage without requiring the large size of current source 410 of transmit circuit 400.

SUMMARY OF THE INVENTION

The line driver of the present invention outputs a pair of transmit signals TX+ and TX− that have substantially reduced voltage variations that result from variations in the power supply voltage. This is accomplished by varying the magnitude of the tail current to offset variations in the power supply voltage.

In accordance with the present invention, a line driving circuit includes a current source that has a tail current transistor. The tail current transistor has a drain, a gate, and a source, where the source is connected to ground. The current source also has a replica circuit which is connected to the tail current transistor. The replica circuit replicates a current path to replicate a first voltage along the current path. The first voltage is a function of a power supply voltage.

The current source further includes an operational amplifier that has an output connected to the gate of the tail current transistor, a positive input, and a negative input connected to the replica circuit. The negative input has a voltage that is substantially equal to the first voltage.

The current source also includes a mirror transistor that has a drain connected to the positive input of the operational amplifier, a gate connected to the gate of the tail current transistor, and a source connected to ground. Further, a bandgap current source is connected to the drain of the mirror transistor.

In addition, the replica circuit includes first and second transistors. The first transistor has a drain, a gate connected to the gates of the tail current and mirror transistors, and a source connected to ground. The second transistor has a drain, a gate connected to the power supply voltage and a source connected to the drain of the first transistor.

The replica circuit further includes a capacitive element that is connected to the power supply voltage and to the negative input of the operational amplifier; and a first resistive element that is connected to the negative input of the operational amplifier and to the source of the second transistor.

In a first alternate embodiment, the line driver further includes a bias transistor that has a drain and gate connected to the gates of the tail current and mirror transistors, and a source connected to ground. In a second alternate embodiment, the line driver also a bias current source that is connected to the gates of the tail current, mirror, and bias transistors.

In addition, the present invention also includes a method for operating a line driving circuit that has a tail current transistor, a mirror transistor, and a current path. The tail current and mirror transistors have gates connected together, while the current path includes the tail current transistor.

The method includes the step of replicating the current path to replicate a first voltage along the current path. The first voltage is a function of a power supply voltage. The method also includes the step of setting a second voltage on the gates of the tail current and mirror transistors. The second voltage is set to define a third voltage which is substantially equal to the first voltage. The method further includes the step of varying the second voltage when the first voltage varies to force the third voltage to be equal to the first voltage.

A better understanding of the features and advantages of the present invention will be obtained by reference to the following detailed description and accompanying drawings which set forth an illustrative embodiment in which the principles of the invention are utilized.

BRIEF DESCRIPTION OF THE DRAWINGS

FIGS. 3A–3E are timing diagrams illustrating the operation of driver 100 when utilizing transmit circuit 200.

FIG. 5 is a schematic diagram illustrating a line driver 500 in accordance with the present invention.

DETAILED DESCRIPTION

Figure 1:
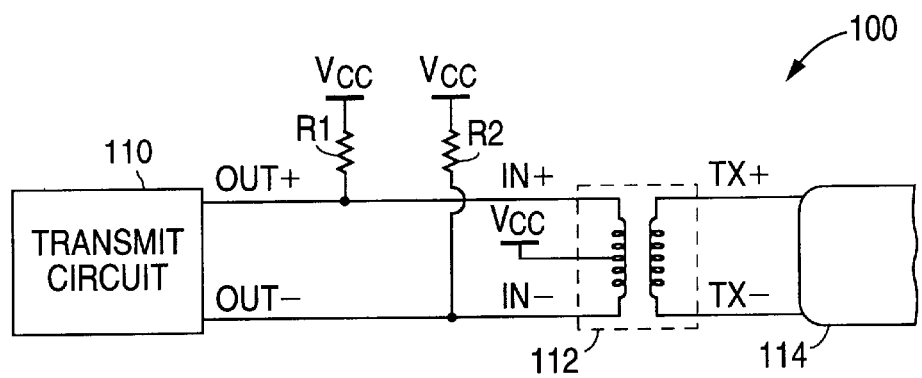
FIG. 1 is a schematic diagram illustrating a conventional 100BASE-T line driver 100.

FIG. 5 shows a schematic diagram that illustrates a line driver 500 in accordance with the present invention. As shown in FIG. 5, driver 500 includes a transmit circuit 510 which has a pair of differential outputs OUT+ and OUT–, and a transformer 512 which has a pair of inputs IN+ and IN– that are connected to the outputs OUT+ and OUT–.

In addition, transformer 512 also has a pair of transmission outputs TX+ and TX– that are connected to a transmission line 514, such as a 100-ohm line. Further, transformer 512 has a center tap connected to a power supply voltage Vcc. (The center tap is only required for signaling protocols, such as the MLT-3, that utilize Vcc as the center point.)

Driver 500 includes a first resistor R1 which is connected between the power supply voltage Vcc and the output OUT+, and a second resistor R2 which is connected between the power supply voltage Vcc and the output OUT–. Resistors R1 and R2 each have a resistance that is equal to one-half the impedance of the transmission line, i.e. 50 ohms.

As further shown in FIG. 5, transmit circuit 510 includes a first transistor Q1 which has a drain connected to the output OUT+, a gate connected to receive a first signal SS1, and a source. Further, circuit 510 also includes a second transistor Q2 which has a drain connected to the output OUT–, a gate connected to receive a second signal SS2, and a source.

In addition, circuit 510 further includes a current source 520 which is connected between transistors Q1 and Q2, and ground. Current source 520, in turn, includes a tail current transistor Q3 which has a drain connected to the sources of transistors Q1 and Q2, a gate, and a source connected to ground.

Current source 520 also includes a replica circuit 522 that replicates the current path that exists when one of transistors Q1 and Q2 is turned on and the other transistor is turned off. Circuit 522 includes a first transistor Q4 which replicates transistor Q3. Transistor Q4 has a drain, a gate connected to the gate of transistor Q3, and a source connected to ground.

Circuit 522 also includes a second transistor Q5 which replicates transistor Q1 (or Q2). Transistor Q5 has a drain connected to the power supply voltage Vcc via a resistor R3, a source connected to the drain of transistor Q4, and a gate connected to the power supply voltage Vcc. (Resistor R3 is not required, but provides beneficial second order effects.) Further, circuit 522 includes a capacitor C1 which is connected to the power supply voltage Vcc, and a resistor R4 which is connected between the source of transistor Q5 and capacitor C1. (Resistor R4 is formed as a just-on MOS transistor.)

As further shown in FIG. 5, current source 520 additionally includes an operational amplifier (op amp) 524 which has an output connected to the gate of transistor Q3, a positive input, and a negative input connected to a node between capacitor C1 and resistor R4. (Op amp 524 is assumed to have an output resistance as necessary to limit the gain.). Capacitor C1 and resistor R4 also serve to decouple the inputs of op amp 524.

Current source 520 also includes a mirror transistor Q7 which has a drain connected to the positive input of op amp 524, a source connected to ground, and a gate connected to the gates of transistors Q3 and Q4; and a capacitor C2 that is connected between the power supply voltage Vcc and the drain of transistor Q7. Further, a bandgap current source BG is connected to output a compensated current to the drain of transistor Q7. Transistors Q4, Q5, and Q7 are formed to be smaller than transistor Q3 so that the current flowing into the drain of transistor Q3 is A times larger than the current flowing into the drain of transistor Q7 (to reduce power consumption).

In operation, replica circuit 522 sets up a voltage V+ equal to the power supply voltage Vcc less the gate-to-source voltage of transistor Q5, i.e., $V+ = VCC - V_{GS}Q5$, on the negative input of op amp 524. Since the drain of transistor Q7 is connected to the positive input of op amp 524, and the gate of transistor Q7 is connected to the output of op amp 524, op amp 524 sets the voltages on the gate and drain of transistor Q7. The voltage on the gate is set to a value which is required to set the voltage on the drain to a value which is equal to the voltage on the negative input of op amp 524. Thus, the voltage on the drain of transistor Q7 is also equal to $Vcc - V_{GS}Q5$.

The voltage on the gate of transistor Q7 then sets the voltage on the gates of transistors Q3 and Q4. The voltage on the gate of transistor Q3, in turn, sets the magnitude of the current I. Driver 500 otherwise operates the same as driver 100, i.e., all of current I is pulled through resistor R2 when the signal SS1 is low and the signal SS2 is high, all of current I is pulled through resistor R1 when the signal SS1 is high and the signal SS2 is low, and one-half of current I is pulled through resistors R1 and R2 when the signals SS1 and SS2 are both high.

In accordance with the present invention, when the power supply voltage Vcc varies, the voltage V+ on the negative input of op amp 524 varies since the voltage V+ is a function of the power supply voltage Vcc, i.e., V+=Vcc−$V_{GS}$Q5. Op amp 524 responds to the difference in voltage on the positive and negative inputs by changing the voltage on the gate of transistor Q7 to the value required to set the voltage on the drain of transistor Q7 to a value which is equal to the new voltage on the negative input of op amp 524.

The new voltage on the gate of transistor Q7 then sets the voltage on the gates of transistors Q3 and Q4 such that transistor Q3 increases or decreases the magnitude of the current I by an amount that offsets the change in the power supply voltage Vcc. For example, if the power supply voltage Vcc increases, the voltage on the drain of transistor Q3 would normally increase as well which, in turn, causes the voltages of the transmit signals TX+ and TX− to increase. In the present invention, however, transistor Q3 sinks a smaller amount of the current I which, in turn, compensates for the increase in the power supply voltage Vcc. As a result, the present invention substantially reduces variations in the voltages of the transmit signals TX+ and TX− due to the increased power supply voltage Vcc.

Similarly, if the power supply voltage Vcc decreases, the voltage on the drain of transistor Q3 would normally decrease as well which, in turn, causes the voltages of the transmit signals TX+ and TX− to decrease. In the present invention, however, transistor Q3 sinks a greater amount of the current I which, in turn, compensates for the decrease in the power supply voltage Vcc. As a result, the present invention substantially reduces variations in the voltages of the transmit signals TX+ and TX− due to the decreased power supply voltage Vcc.

As a result, transistor Q3 sinks a current I that varies as the power supply voltage Vcc varies to provide a line driver that outputs a pair of transmit signals TX+ and TX− which are substantially independent of variations in the power supply voltage Vcc.

One of the advantages of driver 500 is that driver 500 utilizes substantially less silicon real estate than does driver 100 utilizing transmit circuit 400. (Although there appear to be more elements in current source 520 than are in current source 410, many of the elements in current source 520 are very small. As a result, driver 500 is substantially smaller, e.g., approximately one-sixth the size, than driver 100 utilizing transmit circuit 400.)

Another advantage of the present invention is that, unlike prior art bandgap current sources which output a current that varies in response to changes in process, voltage, and temperature (PVT), the present invention removes the influence of the power supply voltage Vcc from the bandgap current source BG.

As shown in FIG. 5, the bandgap current source BG is connected to the power supply voltage Vcc on one side, and the power supply voltage Vcc less the gate-to-source voltage of transistor Q5 on the other side. Thus, only the gate-to-source voltage of transistor Q5 is dropped across the bandgap current source BG.

Being free from changes in the power supply voltage Vcc, the bandgap current source BG need only suppress variations in the gate-to-source voltage $V_{GS}$ of transistor Q5 that occur due to variations in temperature and process (which are small). Variations in temperature and process are easily suppressed by forming the bandgap current source BG to have a very high output impedance. This, in turn, is easy to accomplish by using a cascode circuit structure, and by forming the bandgap current source BG to utilize a low output current.

In addition, due to the current compensation provided by the present invention, driver 500 is substantially independent of PVT variations. Thus, when matched with a high impedance bandgap current source that utilizes a low output current, driver 500 is substantially independent of PVT.

Figure 2:
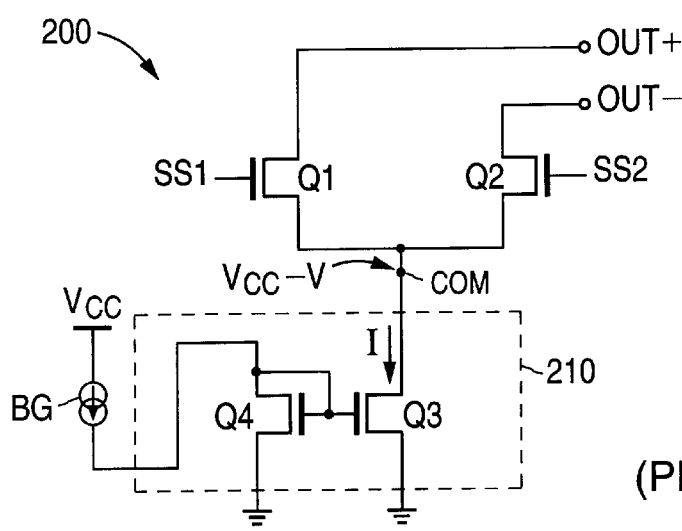
FIG. 2 is a schematic diagram illustrating a conventional transmit circuit 200.
Figure 4:
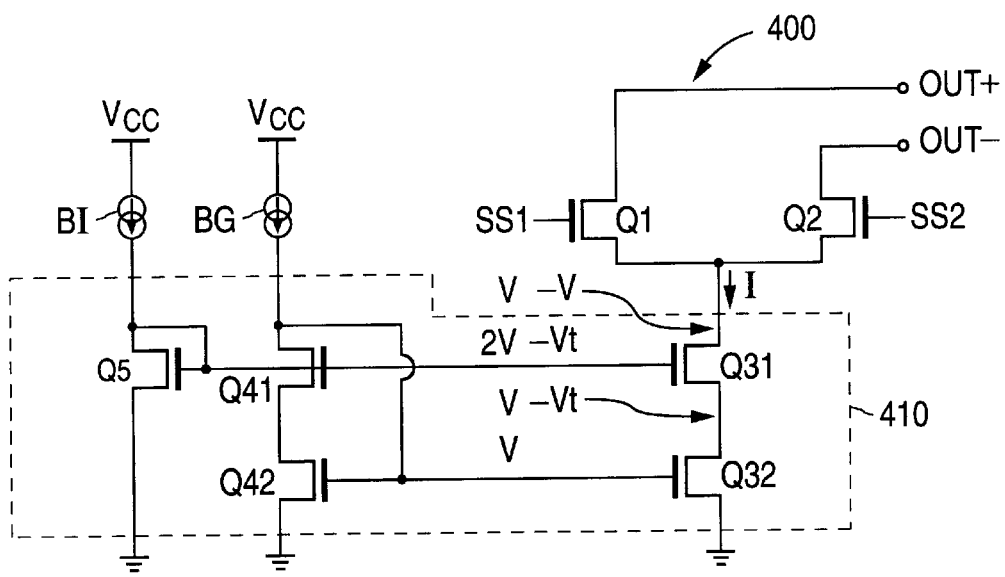
FIG. 4 is a schematic diagram illustrating a conventional transmit circuit 400.

Further, driver 500 requires less headroom both at the input and the output than driver 100 utilizing either transmit circuit 200 or 400. As shown in FIGS. 2 and 4, the drains of transistors Q4 and Q41, respectively, are equal to $V_{GS}$, while the drain of transistor Q7 in FIG. 5 can be as low as $V_{GS}$−Vt, thereby reducing headroom requirements at the input (the drain of transistor Q7). In addition, current source 410 will continue to operate as a current source as long as the voltage on the drain of transistor Q31 is greater than 2($V_{GS}$−Vt), while current source 520 will continue to operate as a current source as long as the voltage on the drain of transistor Q3 is greater than $V_{GS}$−Vt.

The circuit topology shown in FIG. 5 includes a positive feedback loop (from the output of op amp 524 to the negative input of op amp 524), and a negative feedback loop (from the output of op amp 524 to the positive input of op amp 524). In the positive feedback loop, in accordance with the present invention, capacitor C1 and resistor R4 are set to form a low-frequency pole which places a near dc voltage on the negative input of op amp 524 (which is key to stabilizing the loop). The pole also effectively isolates the positive feedback loop from the negative feedback loop.

The negative feedback loop is made to be the dominant feedback loop. This is done for two reasons: more gain in the negative feedback loop (−$gm_7$*$Ro_{BG}$ versus+$gm_4$/$gm_5$); and a lower bandwidth in the positive feedback loop (R4*C1).

In addition, the negative feedback loop has two poles. The first pole is defined by the output impedance of op amp 524, and the gate-to-source capacitance of transistor Q7 in parallel with the gate-to-source capacitance of transistor Q3. When the gain ratio is low, the gate-to-source capacitance of transistor Q7 may be low enough to prevent the first pole from posing any problems. When the gain ratio is high, such as 1:100, or just to eliminate the first pole from further consideration, the first pole can be moved further out in frequency by connecting the output of op amp 524 to ground via a resistance element.

Figure 6:
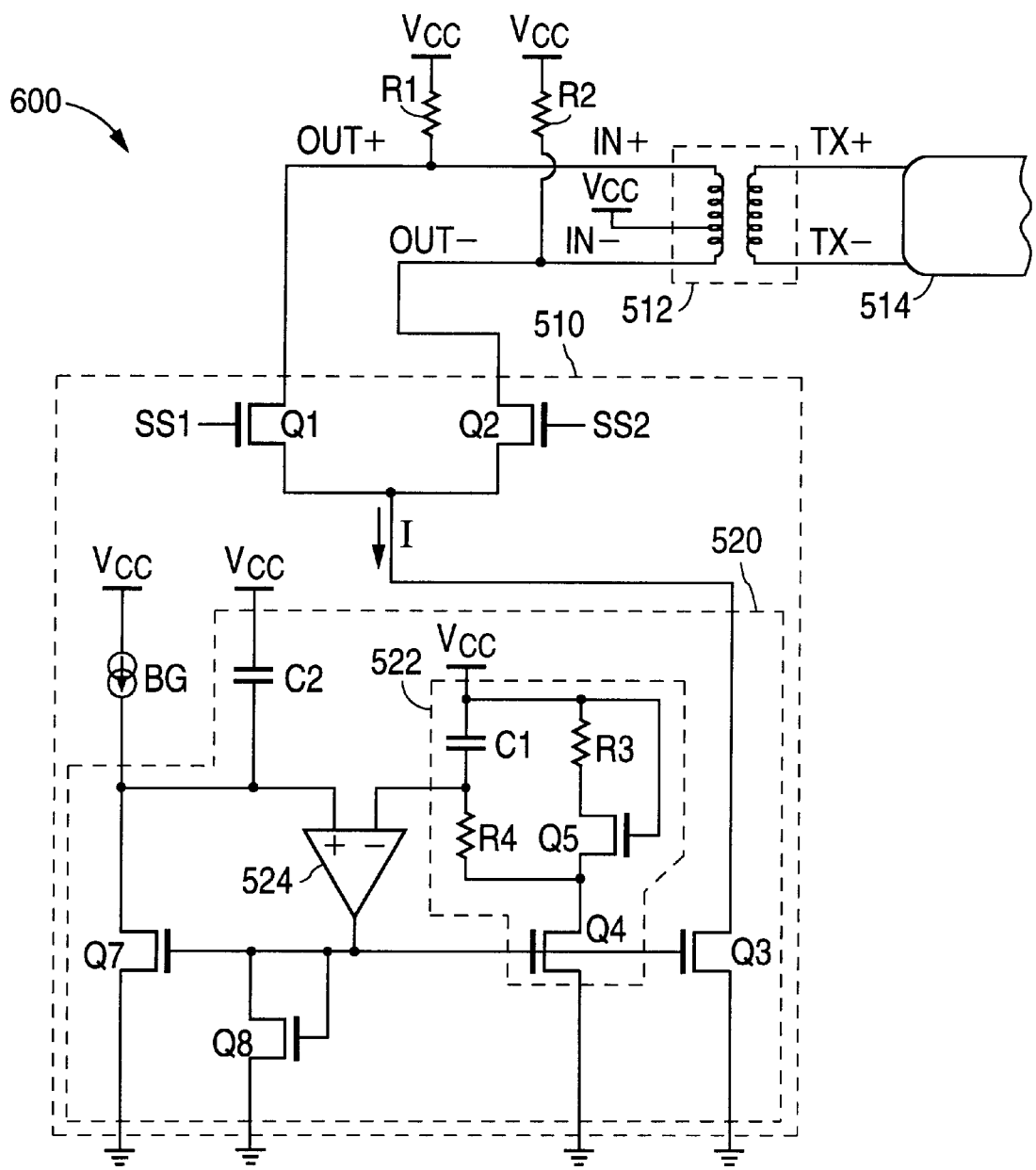
FIG. 6 is a schematic diagram illustrating a line driver 600 in accordance with a first alternate embodiment of the present invention

FIG. 6 shows a schematic diagram that illustrates a line driver 600 in accordance with a first alternate embodiment of the present invention. Driver 600 is similar to driver 500 and, as a result, utilizes the same reference numerals to designate the structures which are common to both drivers.

As shown in FIG. 6, driver 600 differs from driver 500 in that driver 600 includes a bias transistor Q8 which has a drain and a gate connected to the output of op amp 524, and a source connected to ground. (Other well known resistive elements can also be utilized.) When the resistance of transistor Q8 is taken in parallel with the output impedance of op amp 524, the first pole is moved further out in frequency.

Returning to FIG. 5, the second pole in the negative feedback loop is defined by the output impedance of the bandgap current source BG in parallel with the output impedance of transistor Q7, and the capacitance of capacitor C2. The capacitance of capacitor C2 is set to insure that second pole is at an acceptable frequency.

Depending on how the negative feedback loop is to be stabilized, either the first pole or the second pole can be made to be the dominant pole. The second pole can be conveniently set to be the dominant pole since the resistive values are large. Another advantage to using the second pole as the dominant pole is that is that charge injected into the gate of transistor Q3 is dissipated more quickly.

Variations in the drain voltage of transistor Q3 cause charge to be injected into the gate of transistor Q3. Unless this charge is dissipated quickly, the main signal path transient response can be degraded. When the dominant pole is the second pole, this injected charge tends to dissipate more quickly. In addition to keeping the dominant pole away from the gate of transistor Q3, the main signal path transient response can be further optimized by reducing the output impedance of op amp 524.

When the dominant pole is the first pole, the slowly dissipating injected charge tends to undesirably modulate the current I. The first pole can be made to be the dominant pole by placing a large capacitance across the gate-to-source nodes of transistor Q7.

As shown in FIG. 5 (and 6), op amp 524 sources all of the current necessary to set the gate-to-source voltages for transistors Q3, Q4, and Q7 (and Q8). In a second alternate embodiment, a bias current source is added to reduce the current sourcing demands on op amp 524.

Figure 7:
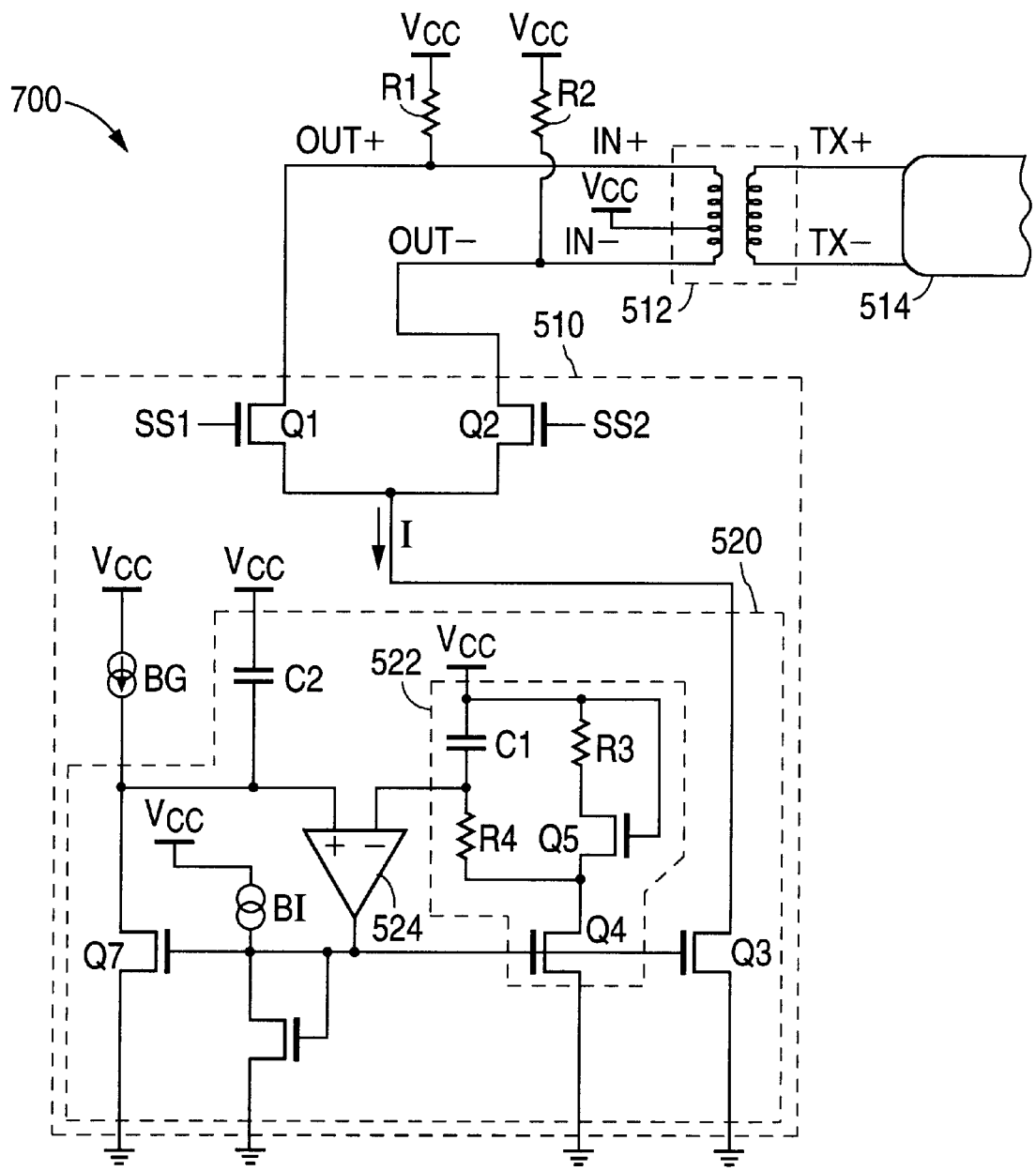
FIG. 7 is a schematic diagram illustrating a line driver 700 in accordance with a second alternate embodiment of the present invention.

FIG. 7 shows a schematic diagram that illustrates a line driver 700 in accordance with a second alternate embodiment of the present invention. Driver 700 is similar to driver 600 and, as a result, utilizes the same reference numerals to designate the structures which are common to both drivers.

As shown in FIG. 7, driver 700 differs from driver 600 in that driver 700 includes a bias current source IB which is connected to source current into transistors Q3, Q4, Q7, and Q8. Current source IB reduces the amount of current that must be sourced by op amp 524. As a result, the output of op amp 524 can be configured to source or sink current only when a voltage on the inputs of op amp 524 changes.

It should be understood that various alternatives to the embodiment of the invention described herein may be employed in practicing the invention. Thus, it is intended that the following claims define the scope of the invention and that methods and structures within the scope of these claims and their equivalents be covered thereby.

What is claimed is:

1. A line driving circuit comprising:
    a current source having:
        a tail current transistor having a drain, a gate, and a source connected to ground;
        a replica circuit connected to the tail current transistor that replicates a current path, the replica circuit replicating a first voltage along the current path, the first voltage being a function of a power supply voltage;
        an operational amplifier having an output connected to the gate of the tail current transistor, a positive input, and a negative input connected to the replica circuit, the negative input having a voltage substantially equal to the first voltage;
        a mirror transistor having a drain connected to the positive input of the operational amplifier, a gate connected to the gate of the tail current transistor, and a source connected to ground; and
        a bandgap current source connected to the drain of the mirror transistor.

2. The line driver of claim 1 and further comprising a capacitor connected to the drain of the mirror transistor.

3. The line driver of claim 2 wherein the replica circuit includes:
    a first transistor having a drain, a gate connected to the gates of the tail current and mirror transistors, and a source connected to ground;
    a second transistor having a drain, a gate connected to the power supply voltage and a source connected to the drain of the first transistor;
    a capacitive element connected to the power supply voltage and to the negative input of the operational amplifier; and
    a first resistive element connected to the negative input of the operational amplifier and to the source of the second transistor.

4. The line driver of claim 3 wherein the capacitive element and the first resistive element form a pole.

5. The line driver of claim 4 wherein the pole places a near dc voltage on the negative input of the operational amplifier.

6. The line driver of claim 5 and further comprising a bias transistor having a drain and gate connected to the gates of the tail current and mirror transistors, and a source connected to ground.

7. The line driver of claim 6 and further comprising a bias current source connected to the gates of the tail current and mirror transistors.

8. The line driver of claim 3 and further comprising a second resistive element connected between the power supply voltage and the drain of the second transistor.

9. The line driver of claim 8 wherein the capacitive element and the first resistive element form a pole.

10. The line driver of claim 9 wherein the pole places a near dc voltage on the negative input of the operational amplifier.

11. The line driver of claim 10 and further comprising a bias transistor having a drain and gate connected to the gates of the tail current and mirror transistors, and a source connected to ground.

12. The line driver of claim 11 and further comprising a bias current source connected to the gates of the tail current and mirror transistors.

13. The line driver of claim 1 and further comprising:
    a first control transistor having a drain, a gate connectable to receive a first signal, and a source connected to the tail current transistor; and
    a second control transistor having a drain, a gate connectable to receive a second signal, and a source connected to the tail current transistor.

14. The line driver of claim 13 wherein the replica circuit includes:
    a first transistor having a drain, a gate connected to the gates of the tail current and mirror transistors, and a source connected to ground;
    a second transistor having a drain, a gate connected to the power supply voltage and a source connected to the drain of the first transistor;
    a capacitive element connected to the power supply voltage and to the negative input of the operational amplifier; and
    a first resistive element connected to the negative input of the operational amplifier and to the source of the second transistor.

15. A method for operating a line driving circuit, the line driving circuit having a tail current transistor, a mirror transistor, and a current path, the tail current and mirror transistor having gates connected together, the current path including the tail current transistor, the method comprising the steps of:
    replicating the current path to replicate a first voltage along the current path, the first voltage being a function of a power supply voltage;
    setting a second voltage on the gates of the tail current and mirror transistors, the second voltage being set to define a third voltage which is substantially equal to the first voltage; and varying the second voltage when the first voltage varies to force the third voltage to be equal to the first voltage.

16. The method of claim 15 wherein the line driving circuit includes an operational amplifier that compares the first and third voltages, and sets the second voltage to force the third voltage to be substantially equal to the first voltage.

17. The method of claim 16 and further comprising the step of supplying a bandgap current to the mirror transistor.

* * * * *